United States Patent

Rouhiainen

[11] Patent Number: 6,076,398
[45] Date of Patent: Jun. 20, 2000

[54] METHOD FOR MEASURING OF FLOW AND FLOWMETER

[75] Inventor: Pekka Rouhiainen, Helsinki, Finland

[73] Assignee: Posiva Oy, Helsinki, Finland

[21] Appl. No.: 08/913,010

[22] PCT Filed: Jan. 15, 1996

[86] PCT No.: PCT/FI96/00029

§ 371 Date: Sep. 4, 1997

§ 102(e) Date: Sep. 4, 1997

[87] PCT Pub. No.: WO97/26442

PCT Pub. Date: Jul. 24, 1997

[51] Int. Cl.[7] .................................................. E21B 47/10
[52] U.S. Cl. ..................... 73/152.29; 73/152.33
[58] Field of Search .......................... 73/152.29, 152.33, 73/152.31, 152.05, 152.41, 801

[56] References Cited

U.S. PATENT DOCUMENTS

| | | | |
|---|---|---|---|
| 2,733,605 | 2/1956 | Buck | 73/152.33 |
| 3,103,813 | 9/1963 | Bourne et al. | 73/152.29 |
| 3,357,492 | 12/1967 | Hubby | 73/152.29 |
| 3,379,059 | 4/1968 | Wiley | 73/152.33 |
| 5,184,677 | 2/1993 | Dobscha et al. | |
| 5,226,485 | 7/1993 | Dobscha et al. | |

FOREIGN PATENT DOCUMENTS 1291856  3/1962  France .

*Primary Examiner*—Harshad Patel
*Attorney, Agent, or Firm*—Andrus, Sceales, Starke & Sawall

[57] ABSTRACT

A measuring procedure and a flowmeter for the measurement of liquid flow in a hole bored in the ground, such as rock. The flowmeter consists of a long cylindrical body comprising: ring-shaped sealing elements (5) placed at a distance from each other in the longitudinal direction to seal off a certain volumetric section from the rest of the hole; dividing elements (6) for dividing the volumetric section into at least three sectors (1) extending from one sealing element to the other; flow ducts (2) interconnecting the sectors; an impulse source (3) placed at the junction of the flow ducts; and sensors (4) placed in the flow ducts for measuring the magnitudes and velocities of currents between sectors by monitoring the velocity and direction of motion of an impulse.

12 Claims, 1 Drawing Sheet

METHOD FOR MEASURING OF FLOW AND FLOWMETER

BACKGROUND OF THE INVENTION

The present invention relates to a measurement procedure and a flowmeter as defined in the claims.

Especially when searching for suitable places for final placement of nuclear waste, it is necessary to obtain information as to what sort of currents are occurring in the rock and its crevasses, i.e. what are the directions and velocities of flow of the currents.

In such measurements, the small volume flows and low flow rates cause problems. In prior art, a method used for determining the magnitude of flow is to separate a certain portion of a hole cut in the rock and to fill it with a suitable mixture or solution. By monitoring the changes in the concentration of this mixture or solution, it is possible to measure the flow. However, this method provides no information about the direction of the flow.

Attempts to determine the flow directions include the use of various marking substances whose passage in the chinks in the rock can be monitored.

A problem with all known methods for flow measurement is that they are slow. Since the rates of flow are of the order of a milliliter per hour, performing a single measurement generally takes months and thus getting results from a large area and multiple bore holes is an expensive and slow business.

SUMMARY OF THE INVENTION

The object of the invention is to eliminate the drawbacks mentioned above. A specific object of the invention is to produce a new procedure and flowmeter by means of which it is possible to measure very small currents in a relatively short time and obtain information about both magnitude and direction of flow.

As for the features characteristic of the invention, reference is made to the claims.

In the procedure of the invention, a certain longitudinal volumetric section is separated from a bore hole made in the rock and flow measurements are performed within this section. The volumetric section is divided in the longitudinal direction of the hole into sectors extending throughout the section, e.g. four 90° sectors, in such a way that the sectors form separate spaces isolated from each other in the volumetric section. The sectors are then connected together via flow ducts permitting free flow between the sectors. After this, by using sensors placed in the flow ducts, the water flow values, i.e. the directions and velocities of flow between the sectors are measured.

Thus, the procedure of the invention is based on a solution whereby a given portion of a bore hole is divided longitudinally into parts or sectors and any currents into or out of the sectors are concentrated or collected in a suitable flow duct system so as to permit the flow in different sectors to be measured.

The flow in the flow duct is preferably measured by generating a suitable impulse in the current and by monitoring the movement of the impulse to discover the direction and velocity of the flow, which, together with the cross-section of the flow duct, can be used to determine the flow rates. The impulse used is preferably an extremely small thermal impulse, e.g. of the order of 1/1000°, whose movement is monitored. The thermal impulse must be very small to avoid producing turbulence in the tiny currents and to ensure that the heat will not be conducted back against the direction of flow. In this way, measurements can be made on extremely small currents, of the order of one milliliter per hour.

The flowmeter of the invention consists of a long cylindrical body comprising two ring-shaped sealing elements expandable by means of internal pressure, placed at a distance from each other in the longitudinal direction of the hole so that a certain volumetric section can be pressure-tightly separated from the hole. Likewise, the flowmeter correspondingly comprises dividing elements expandable against the surfaces of the hole, by means of which the volumetric section can be pressure-tightly divided into at least three, preferably four sectors extending from one sealing element to the other.

The sectors are interconnected via the flow ducts and an impulse source is placed at the junction of the flow ducts while each flow duct is provided with a sensor, so that when currents occur between the sectors, the flow directions and velocities of the currents can be measured from the movements of the impulses in the flow ducts.

The sectors are preferably implemented using collector pipes through which the currents entering the sectors flow into the corresponding flow ducts while the flow ducts are joined symmetrically at a common center located outside the separated volumetric section, the impulse source being placed in said center.

Preferably the impulse source used is a heating thermistor and the sensors are measuring thermistors capable of detecting the heat impulse transmitted by the heating thermistor.

Since there may occur large variations in the currents in different parts of the hole, which may have a length of thousands of meters, very large pressure variations may appear across the flowmeter. For this reason, the flowmeter, which is preferably of a cylindrical design, is provided with an open pipe or other flow duct going through the flowmeter, permitting free flow through the flowmeter between hole portions located on opposite sides of the flowmeter. This prevents the occurrence of pressure differences across the flowmeter that could interfere with the measurement or damage the meter.

The open pipe going through the flowmeter is preferably provided with flow transmitters enabling the amount of liquid flowing through the pipe to be measured. The measurement is preferably implemented using a suitable impulse source with suitable sensors placed on either side of it to measure the direction and velocity of movement of the impulse.

The measuring procedure and flowmeter of the invention have significant advantages as compared with known technology. Using the solution of the invention, currents of a considerably smaller magnitude can be measured than was possible to measure before. Moreover, the directions and magnitudes of the currents both in the longitudinal direction of the hole for each section and for each sector can be measured. In addition, the measurement according to the invention can be performed considerably faster than corresponding prior-art measurements, which take about two months for each hole whereas the solution of the invention provides better and more comprehensive measurement results in less than a week.

BRIEF DESCRIPTION OF THE SEVERAL VIEWS OF THE DRAWING

In the following, the invention is described in detail by referring to the attached drawing, in which.

DETAILED DESCRIPTION OF THE INVENTION

Figure 1:
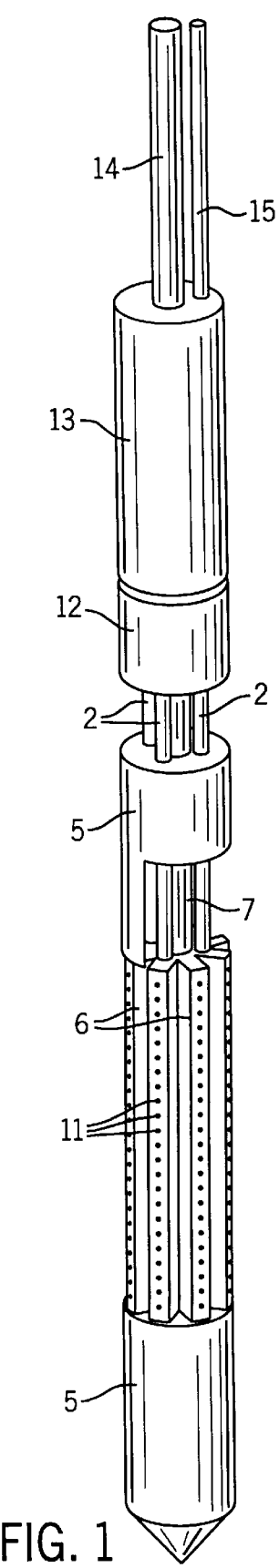
FIG. 1 presents the flowmeter of the invention, partly sectioned.
Figure 2:
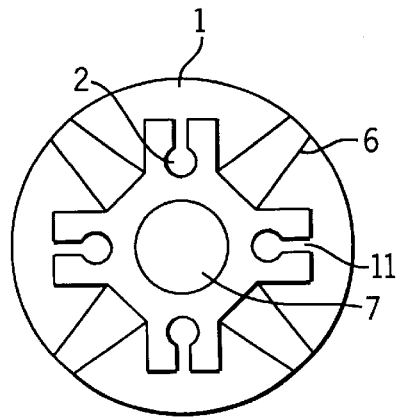
FIG. 2 presents a cross-section of the flowmeter in FIG. 1.

The flowmeter of the invention as presented in the drawing comprises a cylindrical shell and, placed inside the shell at its lower end and in the middle region, ring-shaped sealing elements 5, i.e. elastic parts expandable by means of internal pressure. Between the sealing elements 5 there are four dividing elements 6 as illustrated by the cross-section in FIG. 2, i.e. four ridges or partitions extending from one sealing element to the other and dividing the space between the sealing elements into four 90° sectors. Like the sealing elements, the dividing elements are also expandable by internal pressure so that they can be pressed outwards against the surfaces of the hole under measurement.

Each sector 1 contains a flow duct 2 extending through the whole length of the sector and having a number of apertures 11 opening into the sector.

Figure 3:
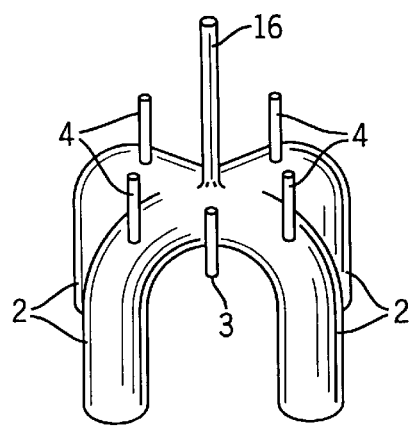
FIG. 3 presents a detail of the flowmeter in FIG. 1.
Figure 4:
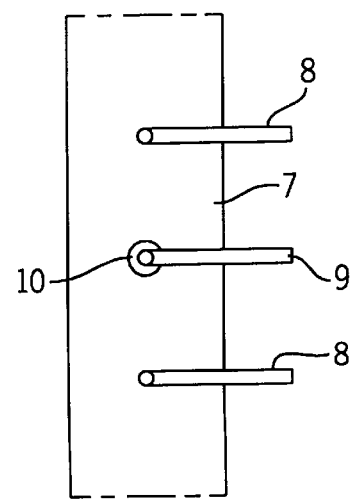
FIG. 4 presents another detail of the flowmeter in FIG. 1.

The flow ducts 2 extend from the sectors past the upper sealing element 5 into a sensor part 12 in which, as illustrated by FIG. 3, the flow ducts join symmetrically relative to the center axis of the flowmeter, forming between the sectors free flow links substantially free of resistance. This can be visualized by superimposing FIG. 3 on FIG. 2.

As shown in FIG. 3, a heating thermistor 3 is placed at the junction of the flow ducts, at their center of symmetry, and each flow duct 2 is provided with a measuring thermistor 4 acting as a sensor, each sensor being placed at the same distance from the heating thermistor.

In addition, the flowmeter comprises an open pipe 7 extending from end to end of the flowmeter, permitting free flow between the hole portions located on opposite sides of the flowmeter. Placed in this open pipe are a heating thermistor 9 and, at suitable distances on either side of it in the direction of flow, sensors 8 enabling the velocity and direction of motion of the heat impulse 10 transmitted by the heating thermistor to be measured.

In FIG. 3, connected to the topmost point on the junction of the flow ducts 2 is a hose 16 which can be opened and closed by means of a valve. The hose extends to the ground surface during measurement and it has three different uses. The topmost space in the measuring system may gather gas which is a handicap to the measurement and it can be removed through the hose 16 by opening a valve placed in the hose. Secondly, the hose 16 can be used as a duct to supply water under a suitable pressure into the section under measurement, thus enabling a hydraulic conductivity test to be carried out on this section. Thirdly, a pressure measurement can be performed on the measurement section via the hose 16.

Moreover, the measuring system comprises a processor, amplifiers, filters, a magnetometer, an A/D converter and valves, said devices being placed at the upper end 13 of the system and consisting of equipment known in itself, by means of which the flowmeter is operated and the measurement results are processed in a manner known itself. Therefore, they will not be described in detail in this context. The flowmeter is connected to above-ground equipment via a cable 14 and a pressure hose 15 while the above-ground equipment comprises a suitable winch or other hoisting device for hoisting and lowering the flowmeter from and into the hole under measurement as well as a suitable measuring computer or a corresponding apparatus for processing the measurement data.

The flowmeter presented in the drawing is used as follows.

The flowmeter, suspended by the cable 14, is lowered into the hole to be measured to a desired measuring depth, i.e. preferably to a depth at which some kind of currents are known to exist in the rock crevices. After the flowmeter has been lowered to the desired depth in the bore hole, the sealing elements 5 as well as the dividing elements 6 are expanded by means of the pressure hose 15 and pressed against the surfaces of the hole so that four sector-shaped sections are formed in the hole, said sections being tightly isolated from the rest of the hole and also from each other.

After this, liquid flow between different sectors is only possible through the flow ducts 2. Therefore, by sending a heat impulse into the liquid flow by means of the impulse source 3, the direction and velocity of motion of the heat impulse, and hence liquid plow, can be measured by means of the sensors 4, allowing accurate information about the flow rates between different sectors to be obtained. The direction is obtained by noting which heat sensor senses the heat impulse. The velocity may be determined by measuring the transit time from impulse source 3 to an impulse sensor 4. In a corresponding manner, heat impulse 10 measurement is used in the open pipe 7 to obtain flow data about the currents flowing past the flowmeter.

As the flow in this type of measurement is very small, even just one milliliter per hour, the thermal impulse also consists of a very small amount of heat. Thus, the amount of heat applied to the current must be small enough to avoid producing turbulence in the current and to ensure that the heat will not be conducted back against the direction of flow. Therefore, the temperatures used are of the order of 1 mK.

The invention has been described above by the aid of the attached drawing, but different embodiments of the invention are possible within the scope of the inventive idea defined by the claims.

What is claimed is:

1. A method for measuring subterranean liquid flow characteristics in a hole bored in the ground, said method comprising the steps of:

sealing the hole at a pair of locations spaced along the axis of the hole to define a longitudinal section in the hole;

forming longitudinally extending seals in the section to define at least three circumferentially arranged chambers, each of which chambers is exposed to a portion of the ground through which the hole is bored and in which liquid flow may occur;

interconnecting the circumferential chambers so that liquid flow among the chambers may occur; and determining the direction and velocity of liquid flow among the interconnected chambers to measure the subterranean liquid flow characteristics.

2. A method as defined in claim 1 further defined as one for measuring the velocity and direction of subterranean liquid flows and as including the step of injecting a pulsatile phenomenon into the liquid flow among the chambers and determining the velocity and direction of movement of the pulsatile phenomenon in those liquid flows.

3. A method as defined in claim 2 further defined as injecting a thermal pulse into the liquid flows among the chambers.

4. A flowmeter for measuring subterranean liquid flow in a hole bored in the ground, said flowmeter comprising:
- an elongated body suitable for being placed in the hole;
- ring-shaped sealing elements (5) on said body for sealing the hole at a pair of locations spaced along the axis of the hole to define a longitudinal section in the hole;
- longitudinally extending sealing members (6) in the section defining at least three circumferentially arranged chambers in the section, each of which chambers is exposed to a portion of the ground through which the hole is bored and in which liquid flow may occur;
- flow ducts (2) interconnecting the circumferential chambers through a common junction so that liquid flow may occur among the chambers;
- a pulse source (3) coupled to said junction for injecting a pulsatile phenomenon into liquid flowing among the chambers; and
- sensors (4) in said flow ducts for sensing the direction and velocity of pulsatile phenomenon in the liquid flow among the chambers to measure the subterranean liquid flow characteristics.

5. A flowmeter as defined in claim 4 wherein said sealing elements and said sealing members are elastic elements which are expandable by internal pressure to be pressed against the ground in which the hole is bored.

6. A flowmeter as defined in claim 4 wherein said body has a central axis about which the chambers are circumferentially arranged and wherein said common junction is proximate said central axis.

7. A flowmeter as defined in claim 4 wherein said pulse source injects a thermal pulse and wherein said sensors are thermal sensors.

8. A flowmeter as defined in claim 7 wherein said pulse source comprises a thermistor.

9. A flowmeter as defined in claim 7 wherein said sensors comprise a thermistors.

10. A flowmeter as defined in claim 4 wherein said body has a longitudinal conduit extending therethrough for providing fluid communication between the portions of the hole on either side of said longitudinal section.

11. A flowmeter as defined in claim 10 wherein said conduit has a pulse source for injecting a pulsatile phenomenon into fluid flowing in said conduit and said conduit has at least one pulsatile phenomenon sensor longitudinally spaced from said pulse source along the axis of said conduit for measuring flow characteristics in said conduit.

12. A flowmeter as defined in claim 4 further including a valved pipe extending from said junction to the surface of the ground.

* * * * *